United States Patent [19]

Keane

[11] Patent Number: 5,033,267
[45] Date of Patent: Jul. 23, 1991

[54] PIVOTABLY-MOUNTED MASTER CYLINDER AND PEDAL LEVER ARRANGEMENT

[75] Inventor: Vincent J. Keane, Melbourne, Australia

[73] Assignee: Brake and Clutch Industries Australia Pty. Ltd., Australia

[21] Appl. No.: 475,405

[22] Filed: Feb. 2, 1990

Related U.S. Application Data

[62] Division of Ser. No. 177,418, Apr. 4, 1988, Pat. No. 4,910,962.

[30] Foreign Application Priority Data

May 28, 1987 [AU] Australia .................. PI2193

[51] Int. Cl.⁵ .................. B60T 11/22; B60T 11/28; F01B 15/02
[52] U.S. Cl. .................. 60/594; 74/512; 92/161
[58] Field of Search .................. 60/533, 589, 594; 92/117 R, 117 A, 118, 142, 110, 113, 161, 146; 74/512

[56] References Cited

U.S. PATENT DOCUMENTS

| | | | |
|---|---|---|---|
| 2,148,273 | 2/1939 | LaBrie | 92/117 X |
| 2,239,673 | 4/1941 | Fowler | 92/117 X |
| 2,241,541 | 5/1941 | Crangle | 92/117 R X |
| 2,284,935 | 6/1942 | White | 60/589 |
| 2,377,017 | 5/1945 | Lacoe | 92/142 X |
| 2,525,740 | 10/1950 | Trevaskis | 92/117 X |
| 2,844,940 | 7/1958 | Huber | 92/161 X |
| 4,671,065 | 6/1987 | Ishiwata | 60/533 |
| 4,753,075 | 6/1988 | Nomura et al. | 60/589 |
| 4,846,012 | 7/1989 | Papenhagen et al. | 74/512 |
| 9,020,465 | 11/1935 | Hall | 60/594 X |

FOREIGN PATENT DOCUMENTS

| | | | |
|---|---|---|---|
| 1243541 | 1/1962 | Fed. Rep. of Germany | 60/533 |
| 3636748 | 5/1987 | Fed. Rep. of Germany | 74/512 |
| 869772 | 11/1941 | France | 60/594 |
| 448212 | 5/1949 | Italy | 60/533 |

Primary Examiner—Edward K. Look
Assistant Examiner—George Kapsalas
Attorney, Agent, or Firm—Stevens, Davis, Miller & Mosher

[57] ABSTRACT

An actuating arrangement for a compact master cylinder includes a foot pedal pivotably connected to support bracket. The cylinder is pivotably connected at its lower end to the foot pedal and at its upper end to the bracket so that movement of the pedal causes movement of the piston into the cylinder and also moves the entire cylinder in relation to the supporting structure.

19 Claims, 4 Drawing Sheets

PIVOTABLY-MOUNTED MASTER CYLINDER AND PEDAL LEVER ARRANGEMENT

This is a Divisional of application Ser. No. 177,418 filed Apr. 4, 1988, now U.S. Pat. No. 4,910,962 dated Mar. 27, 1990.

BACKGROUND OF THE INVENTION

This invention relates to actuators for fluid pressure systems. An example system to which the invention is applicable is a hydraulically operated vehicle clutch system, but the invention has other applications including hydraulic brake systems.

Hydraulic clutch systems typically include a master cylinder which is operated to generate the primary driving force and therefore functions as the system actuator, and a slave cylinder which responds to that force so as to cause operation of the clutch. A foot pedal is generally used as the device through which operation of the master cylinder is achieved. A reservoir containing a supply of hydraulic fluid is connected into the system, usually to the master cylinder, so as to make up for fluid losses which may occur over a period of time.

It is usual to mount the foot pedal and the master cylinder on respective opposite sides of the vehicle fire wall, and the master cylinder needs to be firmly mounted so that the forces generated (primarily tensile) during operation are fully reacted. That is, any deflection of the master cylinder or its mounting will disturb the effectiveness of the system. Such a rigid mounting of the master cylinder presents difficulties and adds to manufacturing and installation costs.

SUMMARY OF THE INVENTION

An object of the present invention is to provide a simple and yet effective actuator for a fluid pressure system. In one particular form, it is an object of the invention to provide an improved master cylinder for use in a hydraulic fluid system, such as a clutch or brake system. It is another object of the invention to provide an improved actuator assembly.

According to the invention, there is provided an actuator for a fluid pressure system, including:

a body having a cylindrical bore therein, a piston having a head portion slidably mounted in said bore and a stem which projects out of said body through one end thereof, a pressure chamber having one part formed within said body between said head portion and an end wall of said body at the end thereof remote from said one end, a passage within said piston forming another part of said pressure chamber and being in communication with the first said part of the pressure chamber, a fluid reservoir, orifice means connecting the interior of said fluid reservoir with said passage, valve means operable to close said orifice means in response to movement of said piston towards said end wall, and a fluid outlet connected to said chamber.

The actuator may be utilized with a foot pedal to provide a pedal actuator suitable for use as a brake or clutch pedal or like applications.

An actuator and pedal actuator having features as aforesaid can be constructed in various ways but it will be convenient to hereinafter describe a particular embodiment of each.

The embodiments of the invention described in detail in the following passages of the specification make reference to the accompanying drawings. The drawings are, however, merely illustrative of how the invention might be put into effect so that the specific form and arrangement of the various features as shown is not to be understood as limiting on the invention.

DETAILED DESCRIPTION OF THE PREFERRED EMBODIMENT

It will be convenient to hereinafter describe the invention as applied to a vehicle hydraulic clutch system, but as previously explained that is not the only application of the invention.

Figure 1:
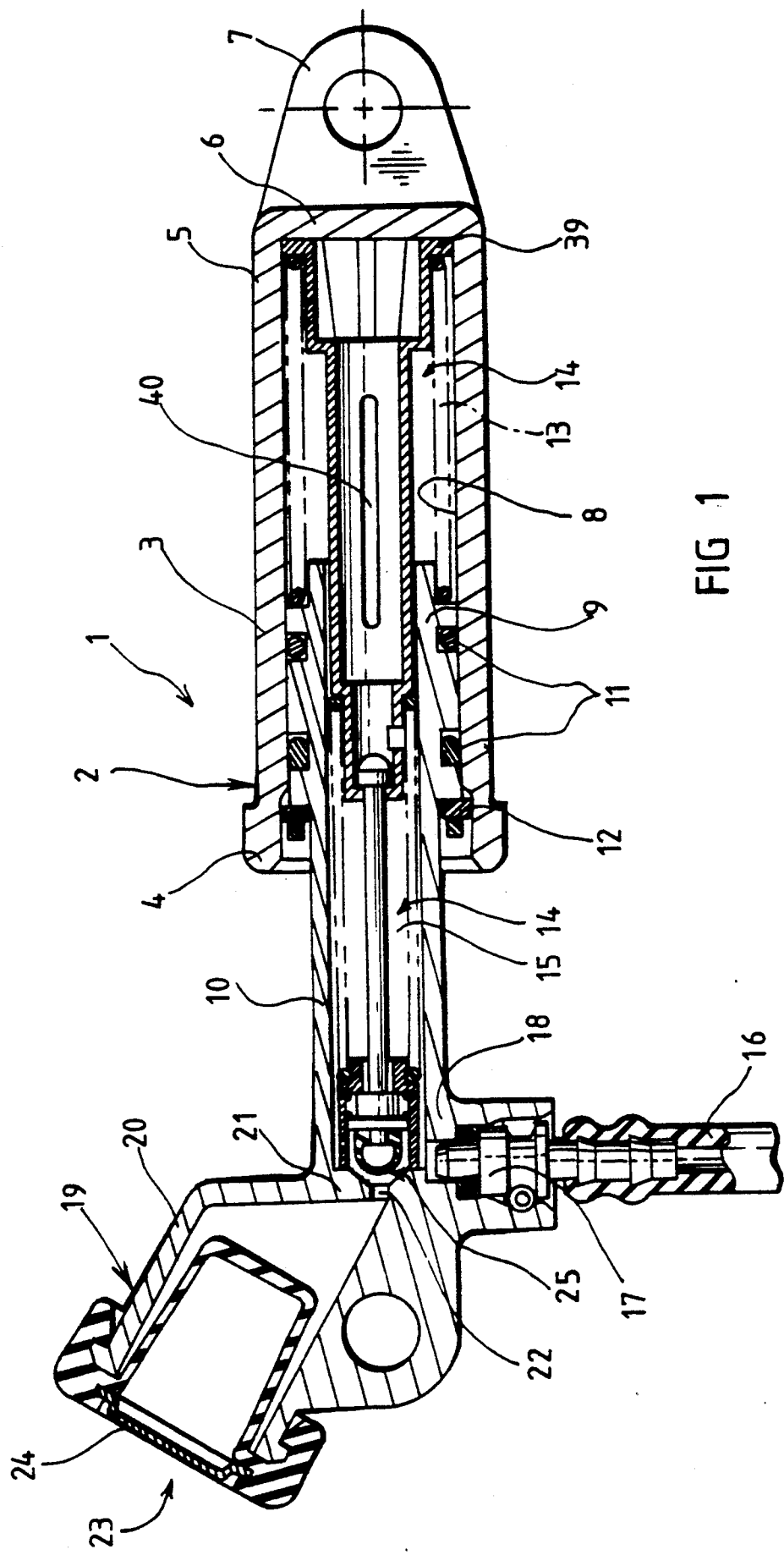
FIG. 1 shows a cross-sectional side view of one embodiment of actuator according to the invention.

The form of actuator 1 shown in FIG. 1 comprises a master cylinder 2 which is composed wholly or substantially of plastics material. Different plastics materials may be selected for different components of the actuator according to the respective use conditions of those components.

The body of the actuator shown is in the form of a tubular member or cylinder 3 which is open at one end 4 and closed at the other end 5 by an end wall 6. A mounting flange 7 projects outwardly from that end wall 6 for a reason hereinafter made clear. The interior of the cylinder 3 is defined by a cylindrical bore 8 which is preferably of constant diameter over at least a substantial part of its length.

A piston 9 is slidably mounted in the cylinder bore 8 and is connected to a stem 10 which projects axially out of the cylinder 3 through the open end thereof. Preferably, the piston 9 and the stem 10 are integrally formed from a suitable plastics material. Sealing means may be provided on the piston 9 for sliding engagement with the surrounding bore surface 8. In the embodiment shown this sealing means comprises a pair of O-ring seals 11. Any suitable stop means 12 may be provided at or adjacent the open end 4 of the cylinder 3 to restrain the piston 9 against movement through that open end 4. In that regard, the stem 10 has a diameter less than that of the piston 9.

Biasing means such as a coil compression spring 13 acts between the piston 9 and the body end wall 6 so as to normally urge the piston 9 towards a rest position at which it is adjacent the body open end 4 engages the stop means 12 secured to the cylinder 3. The part of the cylinder bore 8 between the piston 9 and the body end wall 6 forms portion of a pressure chamber 14. In the arrangement shown, another portion of that chamber 14 is formed by an axial bore 15 formed in the piston 9 and extending into the associated stem 10. That bore 15 extends through the piston end 16 adjacent the cylinder end wall 16. The pressure chamber 14 is connected to an outlet line 16 through an outlet port 17 provided through a side wall 18 of the piston stem 10, preferably at a location remote from the end of the stem 10 which is connected to the piston 9.

A fluid supply reservoir 19 is connected to the hollow stem 10 rather than direct to the cylinder body 3 as in prior actuators. That reservoir 19 includes a hollow body 20 which may be formed integral with the end of the stem 10 which is remote from the piston 9. A transverse wall 21 separates the interior of the reservoir 19 from the stem bore 15 and an orifice 22 is provided through that wall 21 to permit transfer of fluid between the reservoir 19 and the pressure chamber 14. Fluid may be introduced into the reservoir 19 through an access opening positioned remote from the piston stem 10, and removable closure 24 is provided over that opening.

Figure 2:
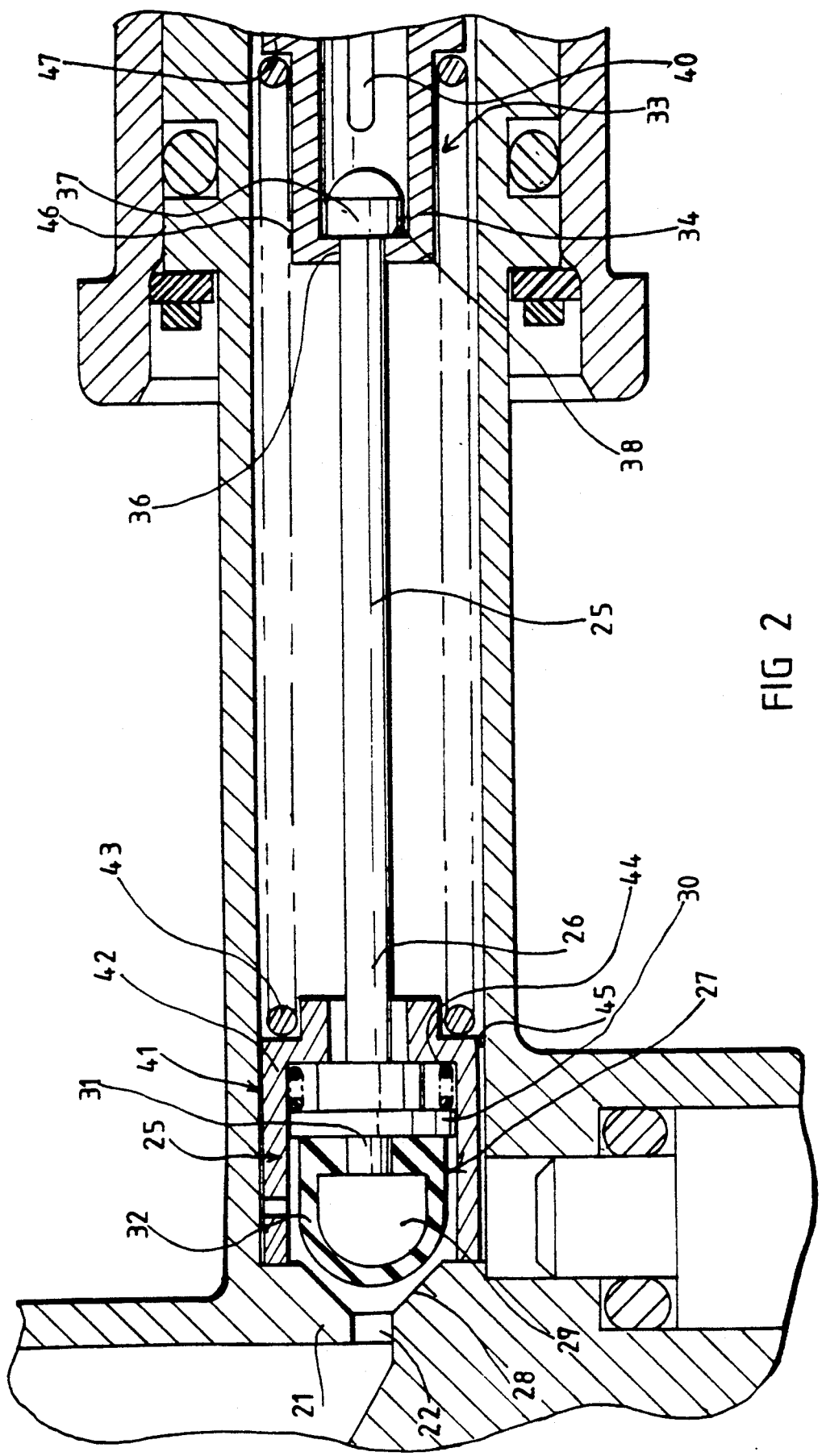
FIG. 2 shows an enlarged cross-sectional side view of a part of the actuator of FIG. 1.

Valve means 25, clearly shown in FIG. 2, is associated with the aforementioned orifice 22 and is operable to close that orifice 22 when the actuator 1 is being operated to cause the piston 9 to move towards the end wall 6 of the cylinder body 3. It is preferred that the valve means 25 is retained in an orifice open position when the piston 9 is at its rest position so that fluid can pass from the reservoir 19 to the pressure chamber 14 in order to make up for any losses occurring during operation of the actuator 1.

In the form shown, the valve means 25 includes a closure element 26 which is located within the piston stem bore 15 and includes a head portion 27 arranged to engage an annular valve seat 28 extending around the aforementioned orifice 22. That valve seat 28 is depicted having a frusto-conical form, but that is not essential. The head portion 27 preferably includes a part-spherical section 29 which forms a terminal extremity of the closure element 26 and which is connected to a circular flange 30 or boss through a neck 31 of reduced diameter. It is preferred that a flexible cap 32 of rubber or other suitable elastomeric material is snap-engaged over that part-spherical section 29 so as to form the valve seat engaging surface of the closure element 26.

Any suitable retaining means 33 may be provided to retain the closure element 26 in an orifice open position when the piston 9 is at its rest position. In the construction shown, that retaining means 33 includes a tubular member 34 which is held against or secured to the end wall 6 of the cylinder body 3, and a rod 35 which connects the aforementioned head portion 27 to that tubular member 34. The rod 35 may be formed integral with the head portion 27 and extends axially from that head portion 27 towards the cylinder body end wall 6. The tubular member 34 extends axially from that end wall 6 towards the cylinder open end 4 and in the arrangement shown projects into the piston bore 15 with clearance.

The connection between the rod 35 and the tubular member 34 is such as to permit limited relative axial movement between those components. In the depicted arrangement, the rod 35 extends through an opening 36 in the adjacent end of the tubular member 34 and is slidable within that opening 36 to permit relative axial movement between the rod 35 and tubular member 34. The end portion of the rod 35 located within the tubular member 34 is provided with an enlargement 37 which is engageable with a transverse abutment surface 38 of the tubular member 34. The enlargement 37 and abutment surface 38 engage when the piston 9 is in its rest position and thereby hold the head portion 27 clear of the valve seat 28 so that fluid can pass between the reservoir 19 and the pressure chamber 14.

When the actuator 1 is operated, the piston 9 moves further into the cylinder body 3 and as a consequence the axial distance between the valve seat 28 and the aforementioned abutment surface 38 is reduced. That reduction permits the closure element head portion 27 to engage against the valve seat 28 and such engagement preferably occurs shortly after operation commences. Continued inward movement of the piston 9 results in the aforementioned rod 35 moving further axially into the tubular member 34, and adequate radial and axial clearance is provided for that purpose.

The tubular member 34 may be held against the cylinder end wall 6 by means of the aforementioned biasing spring 13, and in that event may have a laterally projecting flange 39 at its terminal end to provide a surface against which the spring 13 can engage. Any suitable means may be provided to permit fluid to pass between the interior of the tubular member 34 and the portion of the pressure chamber 14 surrounding that member. In the embodiment shown, one or more longitudinally extending slots 40 are formed through the side wall of the tubular member 34.

Guide means 41 is preferably provided within the piston stem bore 15 to ensure that the head portion 27 of the closure element 26 is correctly aligned with the valve seat 28. That guide means 41 may include a sleeve 42 neatly positioned within the end of the stem bore 15 adjacent the reservoir 19 and which slidably contains the aforementioned head portion 27. The guide sleeve 42 may also function as a stop which limits the degree of movement of the head portion 27 away from the valve seat 28. Opposed surfaces of the sleeve 42 and head portion 27 may engage when the head portion 27 and valve seat 28 are separated to an extent sufficient to permit adequate fluid transfer between the reservoir 19 and the pressure chamber 14.

A coil compression spring 43 acts between the guide sleeve 42 and the tubular member 34 so as to resiliently hold the sleeve 42 against the aforementioned transverse wall 21. That spring 43 allows the sleeve 42 to move away from the transverse wall 21 in the event that axial expansion of the actuator 1 exceeds that at which the aforementioned stop 12 becomes operative.

The head portion 27 of the closure element 26 may be urged against the valve seat 28 by pressure of the fluid within the pressure chamber 14. For that purpose it is preferred to provide adequate clearance between the closure member rod 35 and the guide sleeve 42 to permit fluid within the stem bore 42 to impinge against the head portion 27. Preferably, and as shown, a suitable spring 44 acts between the guide sleeve 42 and the head portion 27 to augment that valve closing influence.

It is preferred that the aforementioned outlet port 17 is located in portion of the stem side wall 18 which surrounds the guide sleeve 42. Appropriate access passage means 45 may be provided in that sleeve 42 or side wall 18 to ensure proper communication between the outlet port 17 and the pressure chamber 14. It is also preferred that the end portion 46 of the tubular member 34 adjacent the valve seat 28 is of reduced diameter to provide a shoulder 47 against which the spring 43 acting on the guide sleeve 42 can engage. One or more openings 48 may be provided through the side wall of that end portion 46 to ensure proper communication between the stem bore 15 and the interior of the tubular member 34.

An actuator 1 as described has important advantages over prior actuators. It is of particularly simple and compact construction, and factors which contribute to that result are the hollow piston stem 10 and the connection of the reservoir 19 to that stem 10 rather than directly to the cylinder body 3. Another advantage arises from the particular valve means described. That valve means provides for only one possible leakage path between the reservoir 19 and the pressure chamber 14, whereas two or more such paths generally exist in prior arrangements.

The actuator 1 of the invention is adapted to be included in a simple and effective actuator assembly. The assembly depicted in FIGS. 3 and 4 of the drawings includes a foot pedal 50 which is arranged to cause operation of the actuator 1.

Figure 3:
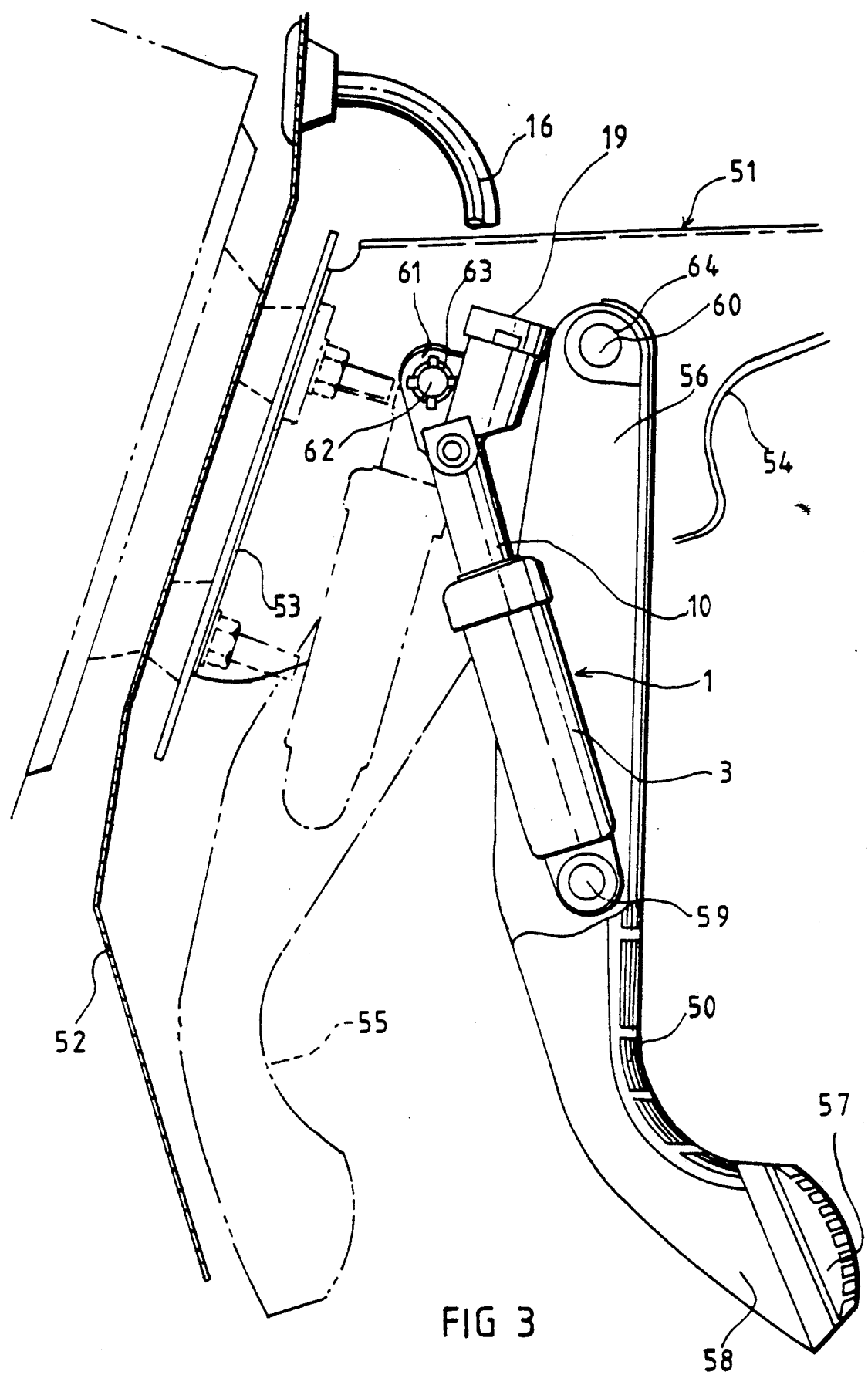
FIG. 3 shows a part cross-sectional side view of a pedal assembly including the actuator of FIG. 1.
Figure 4:
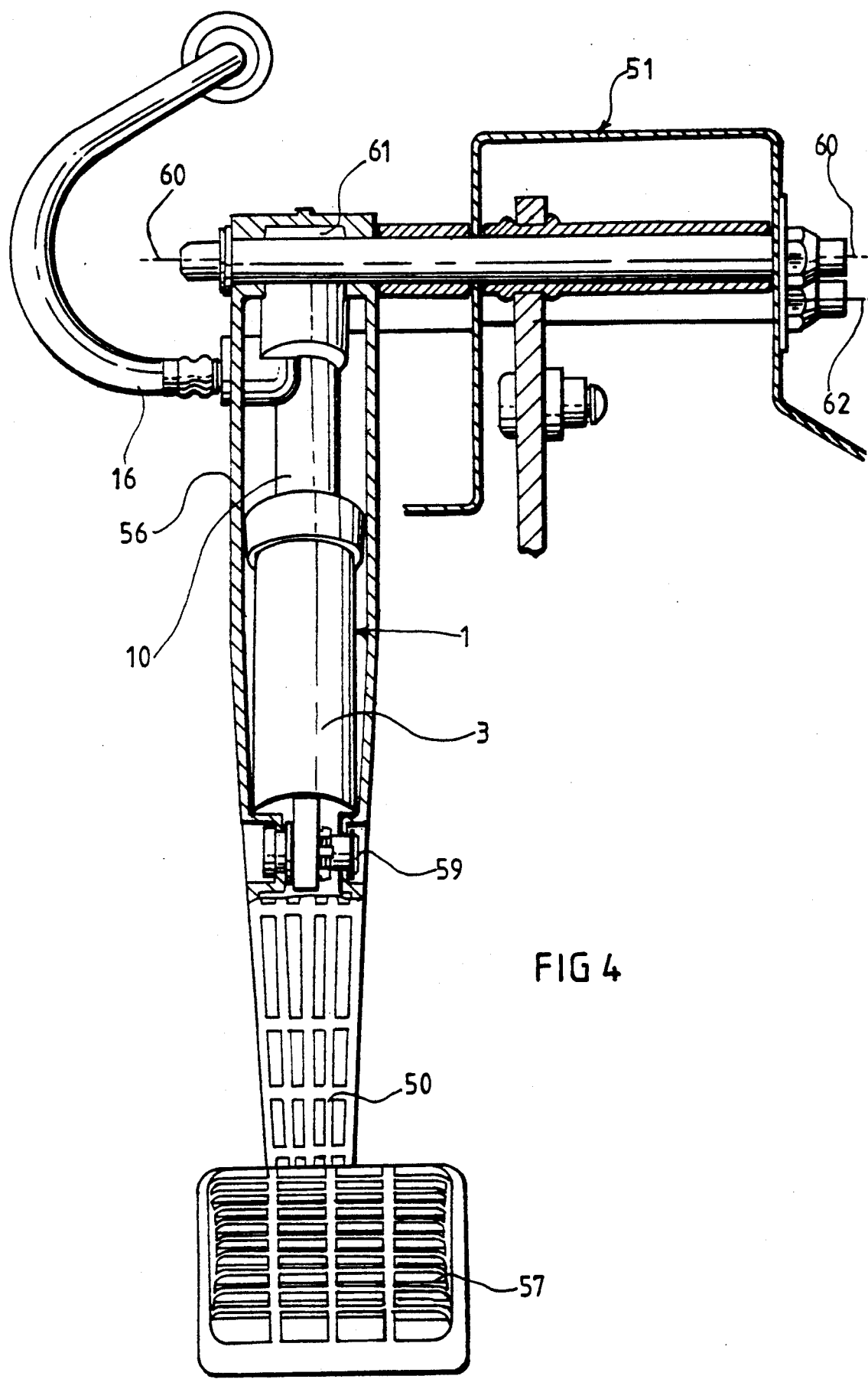
FIG. 4 shows a part cross-sectional front view of the assembly of FIG. 3.

As shown, the actuator 1 and the foot pedal 50 are each connected to a common mounting bracket 51 which is adapted to be secured to a vehicle fire wall 52, for example. The bracket 51 in one form has a base 53 and a pair of side walls 54 upstanding from that base. The foot pedal 50 and the actuator 1 are located between those side walls 54 and each is independently pivotally connected to the bracket 51 for movement towards and away from the bracket base 53. The foot pedal 50 and actuator 1 are also pivotally connected to one another and the arrangement is such that pivotal movement of the foot pedal 50 causes reduction in the axial length of the actuator 1 and thereby operates the actuator 1. The depressed position of the foot pedal 50 is depicted in FIG. 3 by dotted lines 55.

The pedal 50 has one end 56 pivotally connected to the bracket 51 and has a foot engaging pad 57 at its opposite end 58. The body 3 of the actuator 1 is pivotally connected to the foot pedal 50 through the aforementioned mounting flange 7, and that connection is at a location between the ends 56 and 58 of the pedal 60. Preferably, the pedal 50 is of channel-shape between its ends and the actuator body 3 is at least partially located within that channel under all circumstances of use. The axis 59 of the pivotal connection between the actuator and pedal is substantially parallel to the axis 60 of the pivot about which the pedal 50 moves.

A mounting flange 61 is provided at the end of the piston stem 10 remote from the actuator body 3 and that flange 61 is used to pivotally connect the stem 10 to the mounting bracket 51. Once again the pivot axis 62 is substantially parallel to the pivot axis 60 of the pedal. In order to achieve the desired operation of the actuator 1, it is generally preferred to locate the stem pivot 63 adjacent the pedal pivot 64, but at a location closer to the bracket base 53. The arrangement is such that inward swinging movement of the pedal to the position shown by lines 55 causes the actuator piston 9 to move further into the cylinder body 3 thereby pressurising the fluid in the pressure chamber 14.

It will be appreciated that the pedal 50 and actuator 1 need not be connected to a bracket 51 as described. Furthermore, each may be independently connected to a support structure rather than through a common bracket.

An assembly as described is extremely compact and has the advantage of placing the actuator 1 under compression when in use. There is the further advantage of having the reservoir 19 located in direct association with the actuator 1 rather than being remote therefrom.

Finally, it is to be understood that various alterations, modifications and/or additions may be introduced into the constructions and arrangements of parts previously described without departing from the spirit or ambit of the appended claims which define the invention.

I claim:

1. An actuator for a fluid pressure system including a foot pedal pivotally connected to a support structure for movement away from and into a rest position, a piston-cylinder assembly pivotally connected at its opposite ends, one end pivotally connected to said foot pedal and the other end pivotally connected to said support structure said assembly having a piston slidably mounted within a bore of a cylinder member and a pressure chamber formed at least in part within said cylinder member, movement of said piston in one direction relative to said cylinder member being operable to cause a reduction in the volumetric size of said chamber, and the two said pivotable connections with the support structure being spaced apart so that movement of said pedal away from said rest position causes movement of said piston in said one direction and causes movement of said cylinder member relative to said support structure.

2. An actuator for a fluid pressure system according to claim 1 wherein said assembly includes a fluid inlet and a fluid outlet, said outlet is connectable to means to be operated by said actuator, a fluid reservoir is connected to said inlet, and valve means is operable to control passage of fluid through said inlet.

3. An actuator for a fluid pressure system according to claim 1 wherein said piston-cylinder assembly comprises:
   a body having a cylindrical bore therein,
   a piston having a head portion slidably mounted in said bore and a stem which projects out of said body through one end thereof,
   a pressure chamber having a first part formed within said body between said head portion and an end wall of said body at the end thereof remote from said one end, a passage within said piston forming another part of said pressure chamber and being in communication with said first part of the pressure chamber,
   a fluid reservoir,
   orifice means connecting the interior of said fluid reservoir with said passage,
   valve means operable to close said orifice means in response to movement of said piston towards said end wall, and
   a fluid outlet connected to said chamber.

4. An actuator according to claim 3 wherein said valve means is biased to a closed position.

5. An actuator according to claim 3 wherein said valve means comprises a valve closure member linked to said body through a tie, said tie causing said valve closure member to lift off said orifice when the piston moves to a rest position remote from the end wall of the body.

6. An actuator according to claim 5 wherein said piston is biased by means of a spring to said rest position.

7. An actuator according to claim 6 wherein said spring comprises a compression spring which acts between said piston and said end wall and said body is provided with a stop formation for limiting movement of the piston out of the bore.

8. An actuator according to claim 3 wherein the reservoir and piston stem are separated by a transverse wall having said orifice therethrough, said orifice defining a valve seat.

9. An actuator according to claim 3 wherein said valve means comprises a valve closure member having a part spherical head covered with a cap of elastomeric material.

10. An actuator according to claim 9 wherein the head is connected to a rod and said rod extends towards the cylinder and is coupled with a retaining means fixed to the body, the connection between rod and retaining means enabling relative movement between rod and retaining means when the piston is caused to move into the cylinder, but will lift the head off the orifice as the piston moves into a rest position remote from the end wall of the cylinder.

11. An actuator according to claim 10 wherein the retaining means is held to the end wall of the body by a compression spring which acts between said end wall and the piston to bias the piston to the rest position.

12. An actuator according to claim 3 wherein the valve means is located within the passage in the piston stem and a guide means is provided in said passage to guide the valve means towards the orifice.

13. An actuator according to claim 12 wherein the guide means is adapted to limit the degree of movement of the valve means away from the orifice.

14. An actuator according to claim 13 wherein the guide means is movable within the passage and is biased by means of a spring towards the orifice end of the passage.

15. An actuator according to claim 3 wherein the fluid outlet is located in the stem of the piston at the end of said piston which is adjacent said orifice.

16. An actuator according to claim 3 wherein seal means are provided between the piston and the bore, said seal means comprising an elastomeric ring seal located in an annular groove formed around the piston.

17. An acutator according to to claim 3 wherein the piston and the body are both formed of a plastic material.

18. An actuator for a fluid pressure system including a foot pedal having a foot pad end and a pivoted end, said pivoted end being pivotally connected to a support structure for movement between a rearward active position and a forward rest position, a piston-cylinder assembly having a pivot mounting on each end and pivotally connected at a first end to a support structure and at a second end to said foot pedal, said pivotal connection of the first end of the piston-cylinder assembly to its support structure being adjacent to but rearward of the pivotal connection of the foot pedal to its support structure, said pivotal connection of said second end of the piston-cylinder assembly to the foot pedal being spaced away from the pivoted end of the foot pedal and toward the foot pad end thereof, said piston-cylinder assembly having a piston slidably mounted within a bore of a cylinder member and a pressure chamber formed at least in part within said member, movement of said foot pedal from said forward rest position toward said active position being operable to cause a reduction in the volumetric size of said chamber, and also being operable to cause movement of said piston-cylinder assembly in relation to its support structure.

19. An actuator for a fluid pressure system including a generally vertically extending foot pedal having an upper end pivotally connected to a support structure for movement away from and into a rest position, a generally vertically extending piston-cylinder assembly pivotally connected at its upper end to a support structure and pivotally connected at its lower end to said foot pedal, said piston-cylinder assembly having a piston slidably mounted within a bore of a cylinder member and a pressure chamber formed at least in part within said cylinder member, movement of said piston in one direction relative to said cylinder member being operable to cause a reduction in the volumetric size of said chamber, the two said pivotable connections to their support structure being spaced apart, the arrangement being such that movement of said pedal away from said rest position causes movement of said piston in said one direction and also causes movement of said cylinder member in relation to its support structure.

* * * * *